R. A. DINKINS.
DEVICE FOR FRUIT PRESERVING JARS.
APPLICATION FILED APR. 2, 1919.

1,357,155. Patented Oct. 26, 1920.

Inventor
Rosetta A. Dinkins,
By G. Hume Talbert, Attorney

UNITED STATES PATENT OFFICE.

ROSETTA AMERICA DINKINS, OF FRESNO, CALIFORNIA.

DEVICE FOR FRUIT-PRESERVING JARS.

1,357,155.   Specification of Letters Patent.   Patented Oct. 26, 1920.

Application filed April 2, 1919. Serial No. 286,835.

*To all whom it may concern:*

Be it known that I, ROSETTA AMERICA DINKINS, a citizen of the United States of America, residing at Fresno, in the county of Fresno and State of California, have invented new and useful Improvements in Devices for Fruit-Preserving Jars, of which the following is a specification.

The purpose of the invention is to provide a device for use in conjunction with fruit preserving jars whereby, when the latter are closed and sealed, fruit may be kept underneath the juice to prevent its molding. It is a well known fact that with canned fruits, those parts in the upper part of the jar will rise out of the syrup and mold will form on them, whereas if the fruit is kept underneath the juice the mold will not form. Therefore the present invention contemplates the use of a device in which, when the cover is attached to a preserving jar, all the fruit will be forced below the level of the syrup and thereby be kept submerged in the juice to prevent the formation of mold.

Aside from this main purpose, a further purpose of the invention seeks the provision of a device of this character which is simple in construction, durable and effective in operation and inexpensive to manufacture.

To the exact construction in which it is shown and described, the invention is not to be restricted. The right is reserved to make such changes or alterations as the actual reduction to practice may suggest, in so far as such changes or alterations are compatible in spirit with the annexed claim.

In the accompaning drawing:—

Figure 1:
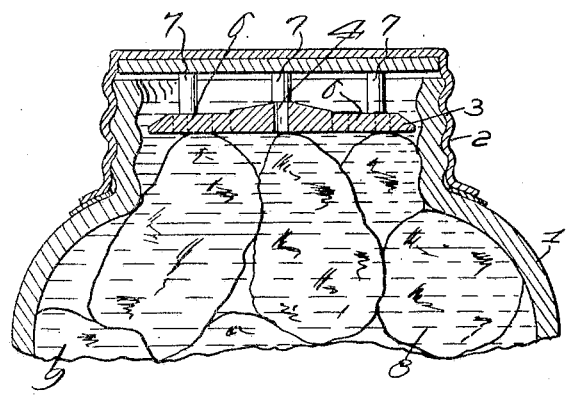
Figure 1 is a longitudinal sectional view through a preserving jar with the cover attached, the improved device being shown in use therewith.
Figure 2:
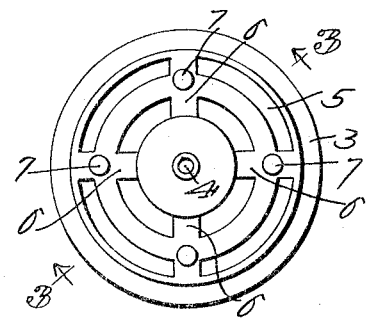
Fig. 2 is a top plan view of the device *per se.*
Figure 3:
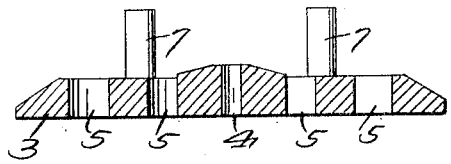
Fig. 3 is a section on the line 3—3 of Fig. 2.

As shown, the invention is used in conjunction with a preserving jar 1 having the usual cap or cover 2. The device itself consists of a circular body member 3 formed with a central hole 4 and with arcuate slots 5, radial webs 6 intervening between the ends of arcuate slots 5. Upstanding on the body portion 3—that is, projecting in axial direction with reference to the body portion—there are the studs 7, the latter emanating laterally from the webs 6. The improved device may be made of any acceptable material of which the most preferable is thought to be fiber.

In the use of the device, the preserved fruit 8 is placed in the jar with the surrounding juice 9 after which the device is placed in on top of the fruit and the cover 1 later attached to the jar in the usual way. The inner surfacing of the cover bears upon the tops of the studs 7 and thus forces the body portion 3 down against the fruit completely submerging the latter below the level of the juice 9, so that no fruit thereafter is exposed to the action of the air to cause the formation of mold. It is obvious also that this submerging of the fruit materially reduces the fermentation occurring after the fruit is placed in the jars.

The invention having been described, what is claimed as new and useful is:

A device for the purpose specified comprising a circular cap member formed with arcuate openings or slots and with upstanding axially disposed studs on one face and adjacent to the perimeter, whereby the studs may be engaged by the end face of a preserving jar cap to force the body member against the contents of the jar to keep the latter submerged in the liquid contents thereof.

In testimony whereof I affix my signature.

ROSETTA AMERICA DINKINS.